US009501175B2

(12) United States Patent
Zhang et al.

(10) Patent No.: US 9,501,175 B2
(45) Date of Patent: *Nov. 22, 2016

(54) TECHNIQUES AND APPARATUS FOR MANAGING TOUCH INTERFACE

(71) Applicant: Intel Corporation, Santa Clara, CA (US)

(72) Inventors: Qing Zhang, Shanghai (CN); Junmin Zhu, Shanghai (CN); Haibo Zang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,149

(22) Filed: Jun. 16, 2015

(65) Prior Publication Data
US 2015/0286338 A1   Oct. 8, 2015

Related U.S. Application Data

(63) Continuation of application No. 13/976,968, filed as application No. PCT/CN2012/086281 on Dec. 10, 2012, now Pat. No. 9,063,612.

(51) Int. Cl.
*G06F 3/041* (2006.01)
*G06F 3/0488* (2013.01)

(52) U.S. Cl.
CPC .......... *G06F 3/0418* (2013.01); *G06F 3/0488* (2013.01); *G06F 2203/04104* (2013.01)

(58) Field of Classification Search
CPC ... G06F 3/041–3/047; G06F 3/0487–3/04886
USPC .................. 178/18.01–19.07; 345/173–178; 715/863
See application file for complete search history.

(56) References Cited

U.S. PATENT DOCUMENTS

| 2013/0063362 A1* | 3/2013 | Papakipos | G06F 1/1626 345/173 |
| 2013/0181941 A1* | 7/2013 | Okuno | G06F 3/041 345/173 |

* cited by examiner

Primary Examiner — Michael Pervan

(57) ABSTRACT

An apparatus may comprise a touch-sensitive user interface, a processor circuit; and a personalized touch event filter that includes a touch trainer module for execution on the processor circuit to generate a user touch profile based upon user touch input received at the touch-sensitive user interface, and a revising plug-in component for execution on the processor circuit to generate a revised touch event based upon a raw touch event received at the touch-sensitive user interface and the user touch profile.

22 Claims, 8 Drawing Sheets

*1100*

TECHNIQUES AND APPARATUS FOR MANAGING TOUCH INTERFACE

CROSS-REFERENCE TO RELATED APPLICATIONS

This application is a continuation of, claims the benefit of and priority to previously filed U.S. patent application Ser. No. 13/976,968 filed Jun. 27, 2013, entitled "TECHNIQUES AND APPARATUS FOR MANAGING TOUCH INTERFACE, which is a U.S. national phase application of PCT/CN2012/86281 filed Dec. 10, 2012, both of which are incorporated herein by reference in their entirety.

BACKGROUND

Touch interfaces such as touchscreens are increasingly being deployed in computing devices, communications devices, entertainment devices and other components. As touch operation is increasingly improving, its widespread adoption in such applications as mobile devices is changing the model of mobile device usage. In particular, a typical touchscreen such as a capacitive touchscreen provides a different user experience as compared to pixel based devices such as a mouse or track pad. This is at least in part due to the multi touch experience afforded by touchscreens which may be sensitive to properties of a human finger, such as pressure, moving speed and size, etc.

One issue that arises with this sensitivity is that typical touch operations employed in touchscreen interfaces may have poor accuracy, especially as compared to mouse or track pad devices. This may lead to user dissatisfaction with operation of a touchscreen device in spite of advantages afforded by a touchscreen. If the results of touch inputs do not match a user's expectation, a user has to revoke an operation and repeat the operation. This reduces the efficiency of device operation and boosts the power consumption of the device during operation. Moreover, even though efforts are underway to develop a variety of more user friendly user interfaces (UI) to provide a better touch experience, it remains difficult to equip the touch based UIs for all native or web applications.

In present day touchscreen devices, the event simulators are typically designed to fetch raw data from the kernel of an operating system and to map it directly for the application involved in the particular touch event. If such raw touch events spring out without revision, the upper application response may be far from a user's expectation. In general, the accuracy and efficiency of interpreting touch events remain key issues that affect the touchscreen device user experience. In particular, different users have different touching habits that are based on differences in finger size, whether a device is held in the left or right hand, sensitive finger snap and environmental noise.

Such personalized traits may involve many unclear or brand-new events which do not take place in standard input devices such as: pixel based mouse, physical sensing keypad, wheel and joystick. To solve these and other issues, a developer has to prepare a variety of events filters to facilitate the ability of applications to adjust to each user, which may difficult because of the large variation in individual traits across potentially hundreds of millions of users.

It is with respect to these and other considerations that the present improvements have been needed.

DETAILED DESCRIPTION

Figure 1:
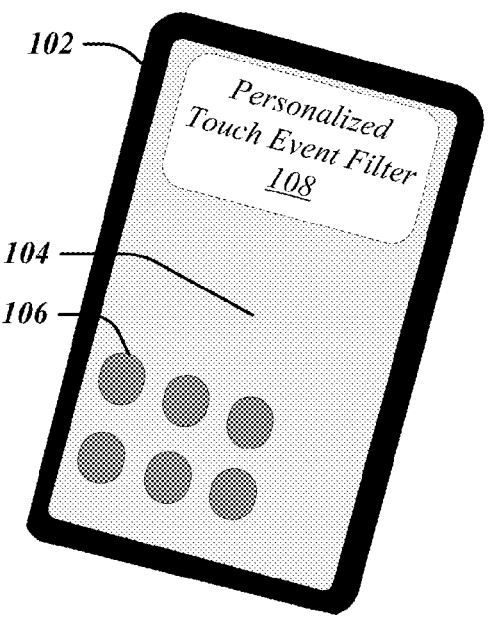
FIG. 1 depicts one embodiment of a touchscreen device.

Various embodiments may be generally directed to methods and apparatus for interpreting touch input received at a user interface of an electronic device. Various embodiments are described herein provide apparatus, methods and systems that process touch events based upon user-specific characteristics. In particular, the present embodiments may include various electronic apparatus that have a user interface that includes a device that detects signals based upon touch. Examples of electronic apparatus that may contain a touch sensing device include a remote control, a touchscreen computer, a personal digital assistant, a cellular telephone, smart phone, a videogame player, an audio player, a home appliance, digital music device, and a display coupled to other devices. Each of these apparatus may employ a touch sensing device to provide touch input to perform one or more functions according to an application running in the electronic apparatus.

In accordance with various embodiments, a personalized touch event filter (PTEF) is provided for an electronic apparatus having a touchscreen in order to generate revised touch events based upon events generated from touchscreen input by a user. In various embodiments, the PTEF is designed to improve the ability of an application to provide accuracy for touch inputs received at the user interface by revising the raw events according to personalized characteristics. The PTEF may be embodied as software or a combination of software and hardware in various embodiments. In particular, in some embodiments, the PTEF may operate in the backend as a pluggable mapping of toolkits, and may provide updated analysis of received touch events before transmitting the revised events to a touch event queue. A toolkit may represent a set of basic building units for user interfaces. The toolkit may be composed of software that is built on the top of an operating system, windowing system, or window manager in order to provide programs with an application programming interface.

The PTEF may be deployed such that applications can choose to receive revised personal touch events by enabling the PTEF or to directly receive raw touch events.

Various embodiments may comprise one or more elements. An element may comprise any structure arranged to perform certain operations. Some elements may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 depicts one example of a touchscreen device 102 consistent with the present embodiments. The touchscreen device 102 may be a tablet device, a notebook computer, netbook computer, cellular telephone, smartphone, television, electronic game device, remote control, or any electronic device provided with a touchscreen surface. The embodiments are not limited in this context. As illustrated, the touchscreen device 102 includes a display surface 104, which may include a capacitive touchscreen or other type of touchscreen. The touchscreen device 102 is operative to receive user input through the display surface, including manual input that may involve contact by a user's fingers and/or thumb.

During touchscreen operation user input may be received at various locations on the display surface 104, as generally provided in known touchscreen devices. In some instances, objects 106, such as icons, may be presented on the display surface 104 that are selectable when a user touches the icon. In other instances, a user may interact with the display surface through one or more operations, such as a single tap, double tap, a sweeping gesture, a squeeze, or other gesture. As illustrated in FIG. 1, the touchscreen device 102 further includes a personalized touch event filter (PTEF) 108, through which the touchscreen device may more accurately interpret such user operations. As noted above, in conventional touchscreen devices, the accuracy and efficiency of interpreting touch events remain key issues that affect the touchscreen device user experience. As detailed below, a personalized touch event filter, such as PTEF 108, addresses this problem by providing, among other features, a personalized profile that takes into account user touch characteristics.

Figure 2:
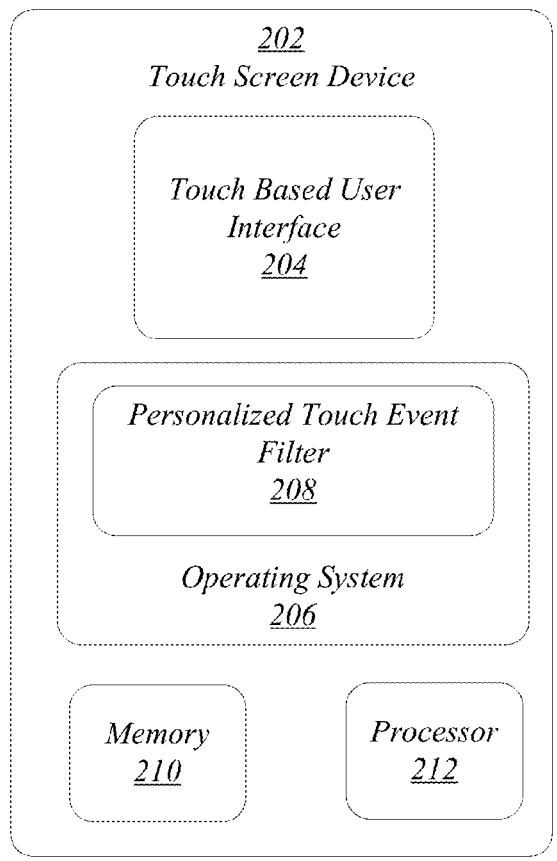
FIG. 2 illustrates a block diagram of a touchscreen device arranged in accordance with the present embodiments.

FIG. 2 illustrates a block diagram of a touchscreen device 202 arranged in accordance with the present embodiments. The touchscreen device 202 includes a touch based user interface 204 such as a capacitive touchscreen. The touchscreen device 202 also includes an operating system 206 that may be used to host one or more applications for performing a set of operations. The touchscreen device 202 also includes a personalized touch event filter (PTEF) 208, which may act to modify touch events that are generated by an application (not separately shown) running on the operating system 206 and based upon input received at the touch based user interface 204. In various embodiments, the PTEF 208 may be embodied in software, hardware, or a combination of software and hardware. As detailed below, the received touch events may be output from the PTEF 208 as revised (or modified) touch events for the appropriate toolkits. In particular, the revised touch events may more accurately define a touch event based upon processing performed by the personalized touch event filter.

As further shown in FIG. 2, the touchscreen device 202 includes a memory 210, which may be used to store a file or files that define a profile or profiles for user touch interaction with the touch based user interface 204. In some instances the memory 210 may be included in the PTEF 208. The touchscreen device 202 also includes a processor 212. According to some embodiments, the PTEF 208 may be operative on the processor 212 to perform various tasks as described below with respect to the FIGs. to follow.

Figure 3:
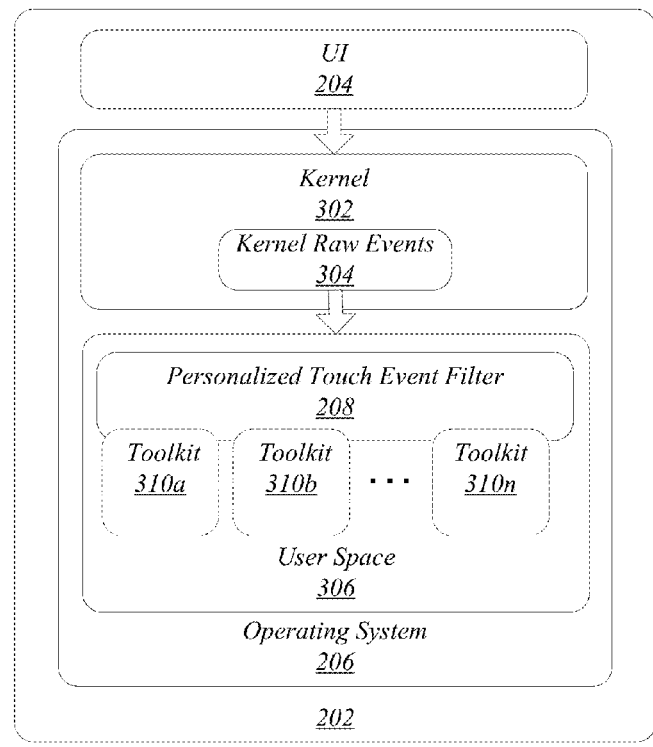
FIG. 3 illustrates details of the architecture of a personalized touch event filter according to some embodiments.

FIG. 3 illustrates details of the architecture of the PTEF 208 according to some embodiments. As shown, the PTEF 208 is arranged to receive events from the kernel 302 of the operating system 206. When user input is received from touch based user interface 204, the kernel 302 may generate the kernel raw events 304, which are processed by PTEF 208. As illustrated, the PTEF 208 and toolkits 310 form part of the user space 306 of the operating system 206. FIG. 3 illustrates that the PTEF 208 may interface with multiple toolkits 310a, 310b, to 310n, where a, b, and n are any positive integer. Examples of toolkits 310 include, among others Qt and GTK, which are each a cross-platform application framework developed as an open source project; enlightenment foundation libraries (EFL). Other software components of the user space 306 that may be coupled to the PTEF 208 include Java® (core) (Java is a registered trademark of Oracle Corporation) and other programming software. The embodiments are not limited in this context.

Figure 4:
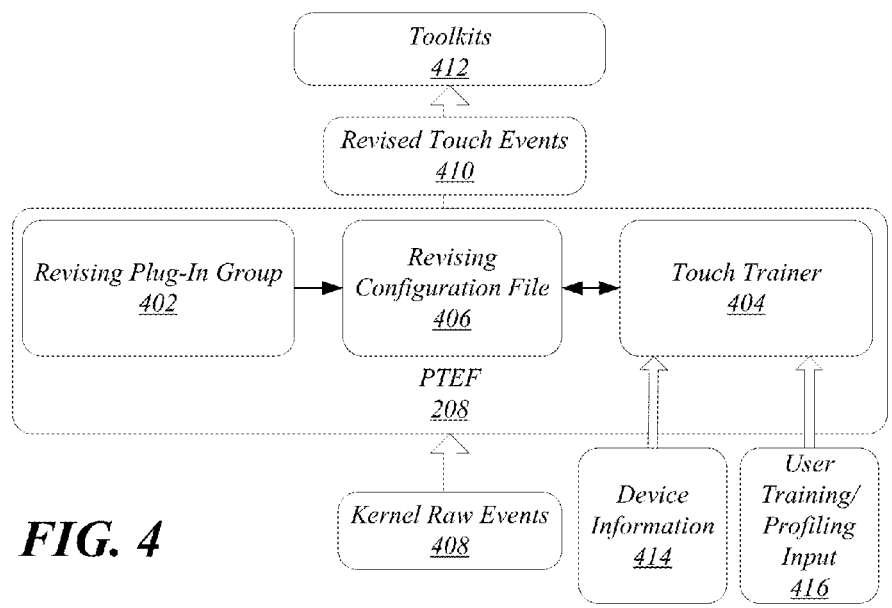
FIG. 4 depicts details of a personalized touch event filter according to some embodiments.

FIG. 4 depicts details of the PTEF 208 according to some embodiments. The PTEF 208 includes a revising plug-in component (or revising plug-in group) 402, a touch trainer module (also referred to herein as "touch trainer") 404, and revising configuration file (RCF) 406. As illustrated, the revising plug-in group 402 is operative to generate output that may be stored into the RCF 406. The touch trainer 404 is operative to both write information into the RCF 406 and to read information from the RCF 406.

As further illustrated in FIG. 4, the PTEF 208 is operative to receive kernel raw events 408 which may be generated when user input is detected at a user interface (see touch based user interface 204 in FIG. 2). Based upon information contained in the RCF 406, the kernel raw events 408 are converted into revised touch events 410, which are output as revised touch events 410 to the toolkits 412. By virtue of the information in the RC 406, the revised touch events 410 may reflect, for example, individual (personalized) characteristics of the user that generates the touch input received as kernel raw events 408. In this manner, the touch input may be more accurately interpreted and acted upon by the appropriate application(s).

In operation, the touch trainer 404 may be employed to develop and store a personalized touch profile, or "user touch profile" for use in revising touch events received as kernel raw events 408. When active, the touch trainer may determine user-specific touch information based upon user interaction with a touchscreen. This interaction is shown as user training/profiling input 416 in FIG. 4. In general, the touch trainer 404 may generate a user's touch habit and adjusted thresholds or touch properties associated with the user for use by the PTEF 208. This information may specifically include the size and shape of a user's digit that interacts with the touchscreen, the pressure applied when the touchscreen is engaged, the rapidity of movement of a user's digit across the touchscreen, the interval between taps when more than one tap is used to engage the touchscreen, and so forth. The user touch profile may be generated and updated during initial training dedicated to developing the user touch profile, as well as during device use when an actual application is running and the user touch input is received to direct operations to be performed.

As noted above, the user specific information may be stored as a user touch profile in the RCF 406. As further illustrated in FIG. 4, the touch trainer 404 is operative to receive device information 414 regarding the device though which user touch input is received. For example, the device information 414 may include touchscreen device properties of the touchscreen device 202. Examples of specific device information 414 include the type of touchscreen technology employed by the touchscreen device 202, such as capacitive touchscreen, resistive touchscreen, infrared touchscreen, optical touchscreen, and so forth. Other examples of device information 414 include the sensitivity of the touchscreen to user input, such as the amount of force required to register input in a touchscreen such as a resistive or capacitive touchscreen. Device information may also include information regarding pixel density of the touchscreen interface employed by the touchscreen device 202.

The combination of user training/profiling input 416 and device information 414 may be employed to revise the kernel raw events 408 when an actual application is running. Referring also to FIG. 2 as an example, in this manner the commands, selections, and other actions performed by a user via the touch based user interface 204 may be more accurately and responsively performed, thereby enhancing the user's experience with the touchscreen device 202.

In addition to the touch trainer 404, the revising plug-in group 402 is operative to generate output for the PTEF 208 to employ to revise kernel raw events 408 in order to output the revised touch events 410. The revising plug-in group 402 may include multiple plug-ins (not shown) that are each designed to address one or more touch features to improve accuracy of generating a touch event in response to user input. In particular, the revising plug-ins may analyze user touch information in the RCF 406 in conjunction with raw touch input, such as in the form of kernel raw events, in order to generate revised touch events.

Figure 5:
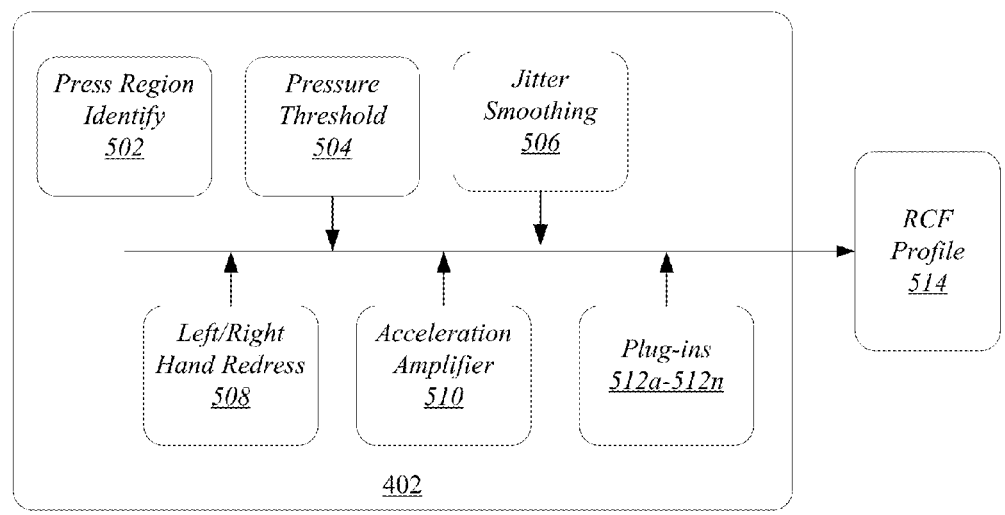
FIG. 5 illustrates one embodiment of the revising plug-in group.

FIG. 5 illustrates one embodiment of the revising plug-in group 402. As shown, the revising plug-in group 402 include multiple plug-ins including a "Press region identify" plug-in 502, a "Pressure threshold" plug-in 504, a "Jitter smoothing" plug-in 506, a "Left/right hand redress" plug-in 508, and an "Acceleration amplifier" plug-in 510. As further shown in FIG. 5, and consistent with various embodiments, the revising plug-in group 402 may include one or more additional plug-ins 512a to 512n. As detailed below with respect to FIGS. 10 and 11, when active the plug-ins of the revising plug-in group 402 may each treat kernel raw events and perform one or more operations to process the kernel raw events and generate revised event output.

Figure 10:
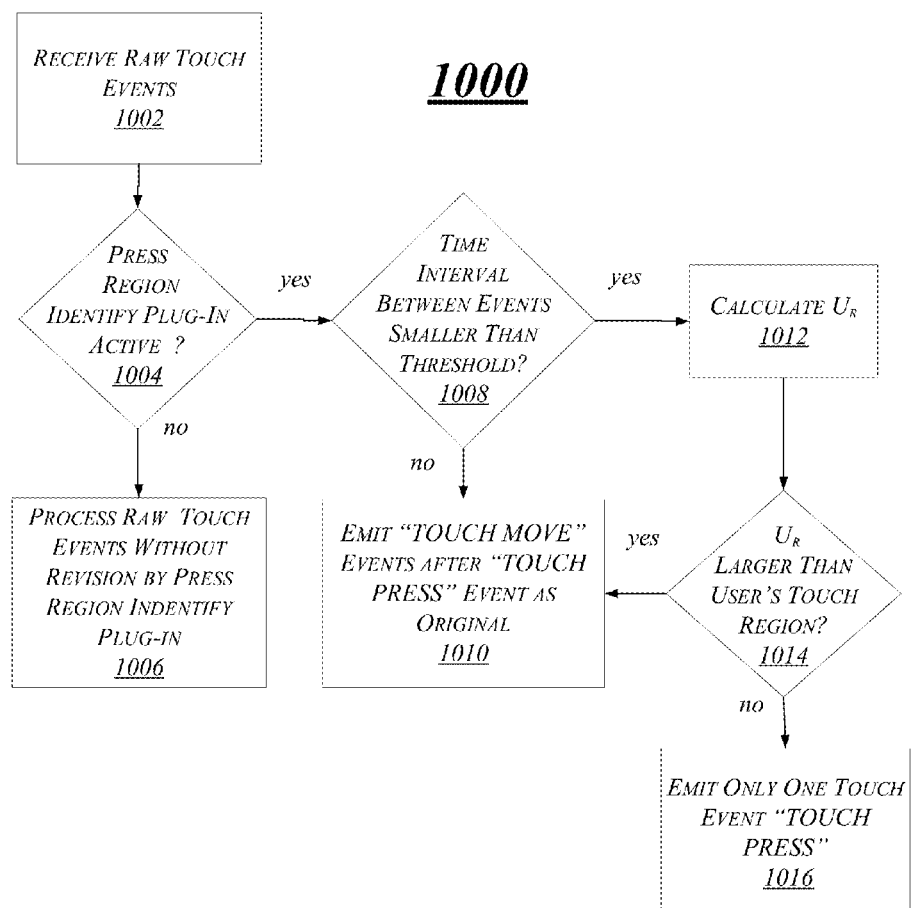
FIG. 10 depicts an exemplary second logic flow.

The "press region identify" plug-in 502 may be used, for example, to determine whether a series of touch events in fact constitute a single touch press event. It is typical that when a user's finger touches a touchscreen that the finger engaging the touchscreen moves unnecessarily, for example from side to side, which actions may cause an operating system in response to generate pointless "touch move" events in addition to the intended "touch press" event. The "press region identify" plug-in is operative to address this circumstance by, for example, building a "touch move" events factory, and by determining whether multiple regions generated by a user's inadvertent sloppy touch response are to be joined to represent a single touch press event. In one example, multiple raw touch events may be deemed to constitute a single touch press event if the interval between touch move events is smaller than a predetermined threshold, and the total area of the multiple touch events is less than a user touch area as predetermined by the personalized touch event filter. FIG. 10 below details further aspects of determining a touch press event consistent with the present embodiments.

Figure 11:
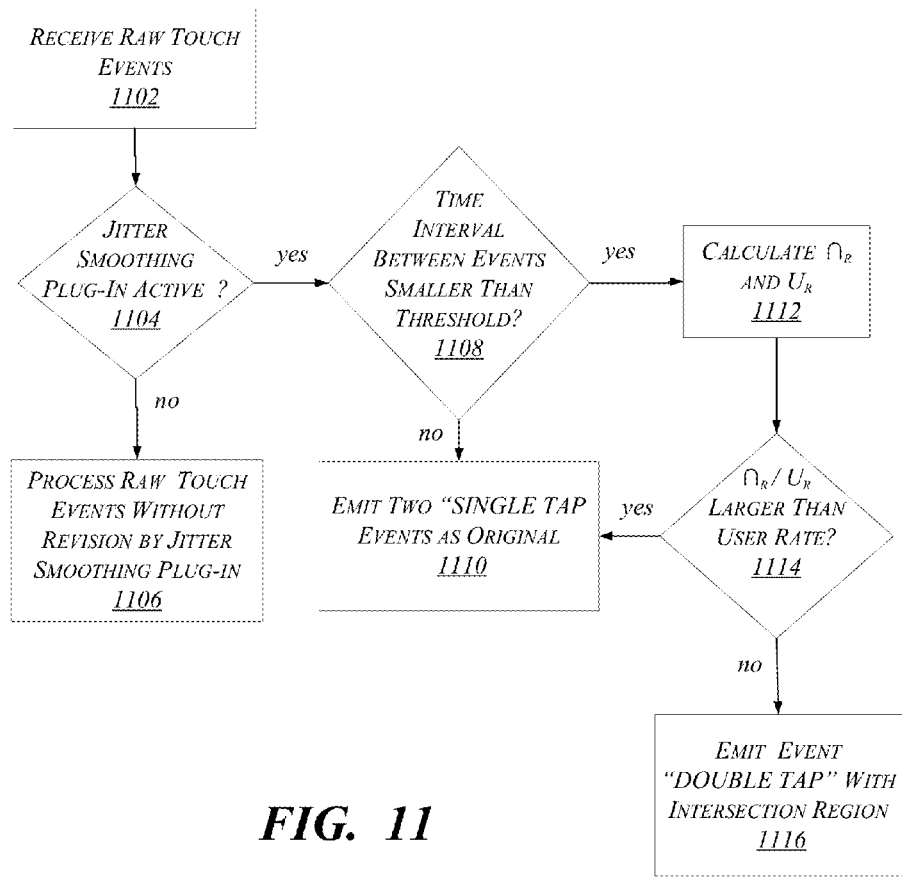
FIG. 11 depicts an exemplary third logic flow.

The "jitter smoothing" plug-in 506 may be used to facilitate accurate determination of whether a continuous tap constitutes a double tap event. In one implementation, the "jitter smoothing" plug-in 506 may create a "touch release" events factor, and set up a time stamp for every touch event in an event queue. The "jitter smoothing" plug-in 506 may generate a "double tap" output in response to a series of raw touch events if certain criteria are met. For example, if the time interval between two raw touch release events is smaller than a threshold which may be prestored in an RCF, and if the ratio of an intersection region of the raw touch events to the union area of the raw touch events exceeds a user preferred rate, a "double tap" event may be output. FIG. 11 below details further aspects of determining a double tap event consistent with the present embodiments.

The "pressure threshold" plug-in 504 may be employed to adjust threshold of pressure received in a raw touch event for determining an actual touch event. This adjustment may be based upon, for example, information in an RCF as determined by a touch trainer. Similarly, the "left/right hand redress" plug-in 508 may adjust raw touch events to account for the handedness of a user. The acceleration amplifier 510 may adjust the acceleration recorded in a user gesture.

Figure 6:
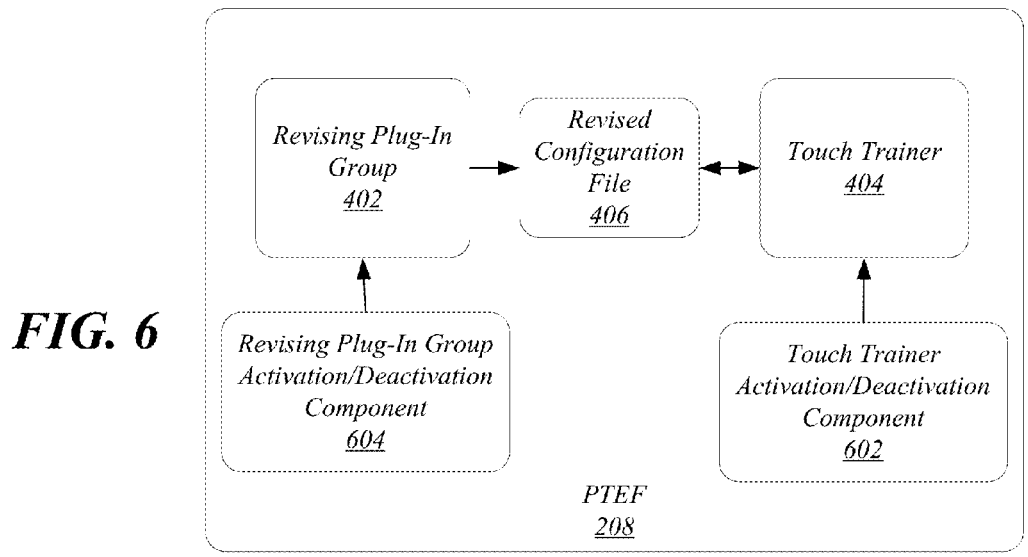
FIG. 6 depicts a configuration of a personalized touch event filter according to some embodiments.

In order to properly manage touch input in a touchscreen device, the present embodiments provide the ability to selectively activate components of a PTEF, such as a touch trainer and/or revising plug-ins. FIG. 6 depicts a configuration of the PTEF 208 according to some embodiments. In the example shown, the PTEF includes a touch trainer activation/deactivation component 602 and a revising plug-in activation/deactivation component 604. The touch trainer activation/deactivation component 602 is arranged to activate operation of the touch trainer 404. In one implementation of the touch trainer activation/deactivation component 602, a touchscreen device that includes the PTEF 208 may provide a selectable item in a user interface that allows a user to activate or deactivate the touch trainer 404. The selectable item may be, for example, an icon or menu item presented on a touchscreen display. Thus, when a user wishes to activate touch training, the user may engage the item provided on the touchscreen display to launch the touch trainer 404. Once activated, the touch trainer 404 may then receive user input from the touchscreen in order to create or update a user touch profile that may be used by the PTEF 208 to modify raw touch events subsequently received at the PTEF 208.

When it is not desirable for the touch trainer 404 to be active, the touch trainer activation/deactivation component 602 may be used to deactivate the touch trainer 404. Thus, a user may select through an icon or other means to deactivate the touch trainer 404 as desired. This may be useful under different circumstances. For example, when an application is active in which user touch input is required to operate the application, in some circumstances it may be desirable that the touch trainer 404 remain active to update the user's touch profile to an RCF 406, while in some cases, it may be desirable that the touch trainer 404 not remain active so that the revision of raw touch events received by the PTEF 208 take place based upon the existing user touch profile. In particular, if a touchscreen device containing the PTEF 208 is to be used by a second user different from the user that created a user profile created for a first user via touch trainer 404, it may be especially desirable to deactivate the touch trainer activation/deactivation component 602 before the second user employs the touchscreen device.

In particular, the deactivation of the touch trainer 404 prevents the inadvertent revision of a user touch profile for the first user based upon the touch characteristics of the second user. For example, the second user may have digits that are very different in size than the first user and/or may employ touch habits that are substantially different from those of the first user. In such circumstances where first and second user touch characteristics substantially differed, were the characteristics of both the first and second user to be stored in a common user touch profile, the results would not accurately reflect the touch characteristics of either user. Accordingly, in operation, when raw touch events generated by the first user were received by the PTEF 208 while the user touch profile for the first user were active, the revision of the raw touch events to reflect the first user's personal touch characteristics may not be as accurate as in the case where the user touch profile for the first user actually only contained touch input from the first user.

Consistent with the present embodiments, the revising plug-in activation/deactivation component 604 may also provide for selective activation or deactivation of the revising plug-in group 402. When the revising plug-in group 402 is active one or more of the plug-ins contained therein are active to process received raw touch events and to thereby generate revised touch events according to the operation of the individual plug-in or plug-ins. However, as with the touch trainer activation/deactivation component 602, in some cases it may be desirable that one or more plug-ins of the revising plug-in group 402 be inactivated. In such cases, and consistent with the present embodiments, a user may select to deactivate the revising plug-in group 402.

Figure 7:
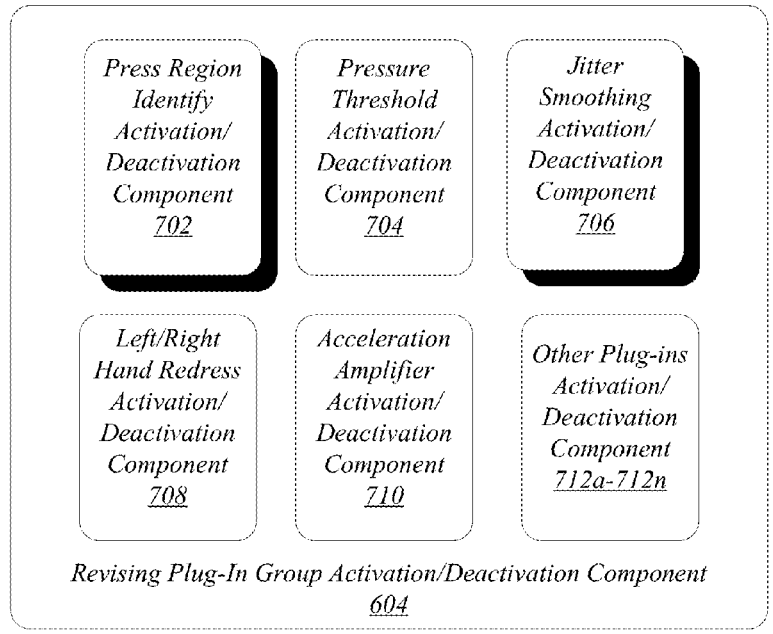
FIG. 7 depicts one embodiment of a revising plug-in activation/deactivation component.

In some embodiments, individual plug-ins of the revising plug-in group 402 may be individually selectable for activation/deactivation. In this manner, a user may tailor the type of operations, if any, to be performed on raw touch input events as desired. FIG. 7 depicts one embodiment of the revising plug-in activation/deactivation component 604. In this example, the revising plug-in activation/deactivation component 604 includes multiple sub-components that provide for the individual activation/deactivation of respective individual plug-ins that form part of a revising plug-in group. In the example shown in FIG. 7, the sub-components illustrated correspond to the individual plug-ins of the embodiment of the revising plug-in group 402 that is illustrated in FIG. 5. In particular, the revising plug-in activation/deactivation component 604 may include a press region identify activation/deactivation component 702, a pressure threshold activation/deactivation component 704, a jitter smoothing activation/deactivation component 706, a left/right hand redress activation/deactivation component 708, and an acceleration amplifier activation/deactivation component 710. The revising plug-in activation/deactivation component 604 may further activation/deactivation components for any other plug-ins that may be provided in the revising plug-in group 402, which are generally depicted as the other plug-ins activation/deactivation components 712a-712n.

By providing individual activation/deactivation for each plug-in of the revising plug-in group 402, the embodiment of the revising plug-in group activation/deactivation component 604 of FIG. 7 allows a user to activate or deactivate only those plug-ins of interest at any given instance. In the scenario suggested by FIG. 7, for example, a user may activate the "press region identify" plug-in 502 and "jitter smoothing" plug-in 506 by engaging a respective icon or other device (not shown) that engages the respective press region identify activation/deactivation component 702, and jitter smoothing activation/deactivation component 706 to activate their respective plug-ins. Once active, the "press region identify" plug-in 502 and "jitter smoothing" plug-in 506 may perform appropriate operations associated with each respective plug-in when raw touch events are received by a PTEF containing the revising plug-in group activation/deactivation component 604. This scenario may take place, for example, when the user has determined that for a certain application, the plug-ins selected for activation, such as the "press region identify" plug-in 502 and "jitter smoothing" plug-in 506 are most effective to accurately generate revised touch events that capture the user intention based upon input of raw touch events. Other plug-ins, on the other hand, which may not be needed, may be deactivated, as also suggested by FIG. 7.

As noted previously, in some cases, multiple users may frequently or upon occasion, use the same touchscreen device. To account for this, the present embodiments provide the ability of a personalized touch event filter to store and employ multiple different user touch profiles, so that the appropriate user touch profile may be used to revise raw touch events according to the current user of the touchscreen device containing the personalized touch event filter. Moreover, multiple user touch profiles may be stored for the same user. This may be useful, for example, to tailor the user profile according to the type of activity and or application to be run on a touchscreen device. For example, during browsing or reading of an electronic book, the touch characteristics employed to engage a touchscreen may differ from the touch characteristics that the same user employs to create or read electronic mail. Accordingly, an individual user may wish to activate a specific user touch profile based upon a planned activity to be performed on a touchscreen device.

Figure 8:
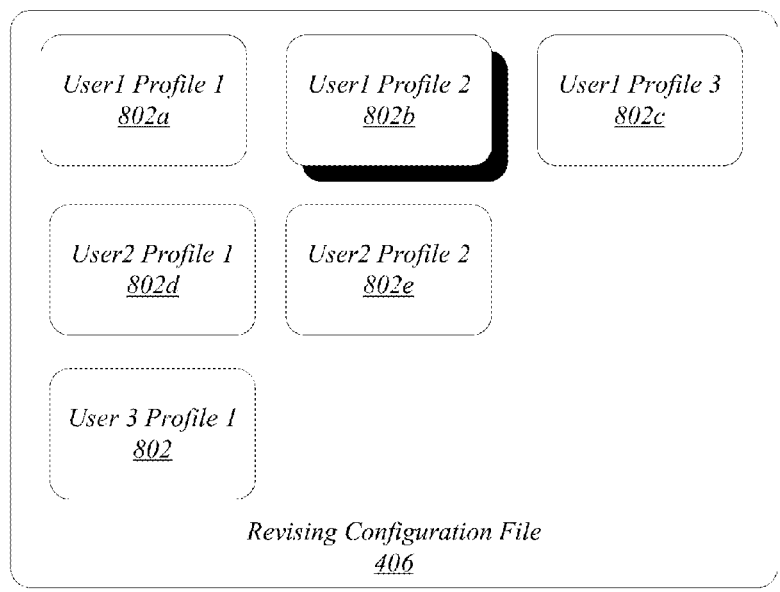
FIG. 8 depicts an embodiment of the revising configuration file 406 that includes multiple user touch profiles.

FIG. 8 depicts an embodiment of the revising configuration file 406 that includes multiple user touch profiles. In particular, the revising configuration file 406 includes a "user 1 profile 1" 802a, a "user 1 profile 2" 802b, a "user 1 profile 3" 802c, a "user 2 profile 1" 802d, a "user 2 profile 2" 802e, and a "user 3 profile 1" 802f. As with the activation/deactivation of revising plug-ins and touch trainers, in various embodiments, the activation of a desired user touch profile may be provided through a component provided on a touchscreen, such as an icon or menu item. In one example, as suggested by FIG. 8, a touchscreen device user may select for activation the user touch profile designated by "User1 profile 2" 802b. This may correspond, for example, to a user touch profile for a first user that is developed specifically for interacting with an electronic mail application. In particular, the "User1 profile 2" 802b may reflect user touch characteristics employed by the user when the user performs such actions as scrolling through email and typing on a virtual keypad. Thus, the user may wish to invoke "User1 profile 2" 802b whenever the user is to read or generate electronic mail. Any one of the other user profiles shown in FIG. 8 may be activated when appropriate for other combinations of users and/or actions to be performed on the touchscreen device for which the revising configuration file 406 is used. For example, the "User1 profile 3" 802c may reflect user touch characteristics employed by the user when interacting with a web browser application.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
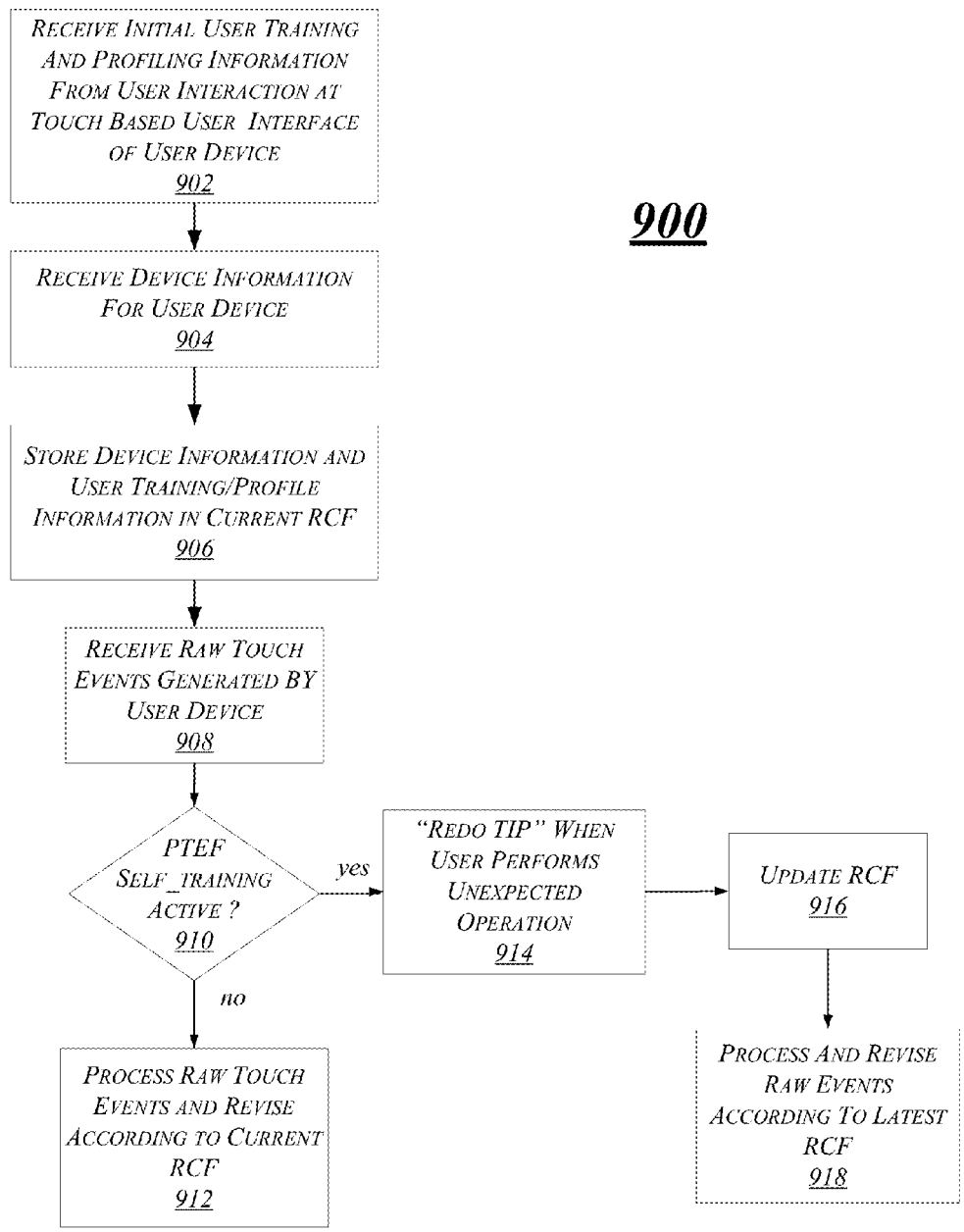
FIG. 9 depicts an exemplary first logic flow.

FIG. 9 depicts an exemplary first logic flow 900. The logic flow 900 may be implemented, for example, by a PTEF component, and in particular by a touch trainer arranged according to the present embodiments and generally described with respect to the preceding FIGs. At block 902, initial user training and profiling information is received from user interaction at a touch based user interface of a user device. In one example, the touch based user interface is a touchscreen surface of an electronic device, such as a capacitive touchscreen. The user interaction may involve a series of actions that involve one or more types of touch events, gestures, or other movements in which the user engages the touchscreen surface.

At block 904, device information is received for a user device for which the initial user training and profiling information is received. For example, the device information may include touchscreen device properties.

At block 906 the device information and the user training/profile information is stored to a memory, such as in a current revising configuration file (RCF).

At block 908, raw touch events generated by the user device are received. The raw touch events may be generated by an operating system kernel when an active application is running and a user interacts with a touchscreen of the user device. The raw touch events may be received by a personalized touch event filter arranged according to the embodiments disclosed herein.

At decision block 910, a determination is made as to whether PTEF self training is active. The PTEF self-training when active may allow the current RCF to receive updates based upon user interaction with the touch based interface of the user device. If, at decision block 910, a determination is made that the PTEF self-training is not active, then the logic flow proceeds to block 912.

At the block 912, the received raw touch events are processed and revised according to the current (latest) RCF. Thus, the current RCF may reflect a personalized touch profile for the user that was generated and stored based upon previous user interaction with a touchscreen of the user device. This current RCF is then used to generate revised touch events based upon the received raw touch events generated by the operating system kernel.

If, at decision block 910, a determination is made that the PTEF self-training is active, then the logic flow proceeds to block 914. At block 914, a "redo tip" is generated when a user performs an unexpected operation while interacting with a touch based user interface, such as a touchscreen. The unexpected operation may be analyzed and stored to an updated user profile in the PTEF. The flow then proceeds to block 916.

At block 916, the RCF is updated based upon the unexpected user operation. The flow then proceeds to block 918. At block 918, the detected raw events are processed and revised according to the updated RCF.

FIG. 10 depicts an exemplary second logic flow 1000. The logic flow 1000 may be implemented, for example, by a PTEF component, and in particular by a revising plug-in component (group) arranged according to the present embodiments and generally described with respect to the preceding FIGs. At block 1002, raw touch events are received. The raw touch events may be generated by an operating system kernel when an active application is running and a user interacts with a touchscreen of the user device. The raw touch events may be received by a personalized touch event filter arranged according to the embodiments disclosed herein.

At block 1004 a determination is made as to whether a "press region identify" plug-in is active. The "press region identify" plug-in may form part of a set of plug-ins of a revising plug-in group as described hereinabove.

If the "press region identify" plug-in is not active, the flow moves to block 1006. At block 1006, the raw touch events are processed without revision by the "press region identify" plug-in.

If the "press region identify" plug-in is determined to be active, the flow moves to block 1008. At the decision block 1008, a determination is made as to whether a time interval between succeeding touch events is smaller than a threshold. In one example, the threshold may be set to reflect an interval that represents an upper limit that is indicative of a single touch event.

If, at block 1008, it is determined that the interval between succeeding touch events is not less than the threshold, the flow moves to block 1010. At block 1010, one or more "touch move" events are output after an original "touch press" event is output.

If, at block 1008, it is determined that the interval between succeeding touch events is less than the threshold, the flow moves to block 1012. At block 1012, a calculation is performed to determine an area $U_r$ that represents the area of a single region defined by the sum of the multiple touch events. In one example, the area Ur may be determined by adding up individual areas of touch events and subtracting from that sum the area corresponding to regions of overlap between touch events.

The logic flow then proceeds to decision block 1014, where a determination is made as to whether the value of $U_r$ is greater than a user's touch region. The user's touch region may be represented by an area that is characteristic of a user touch. In one example, such an area may be determined by a touch trainer as detailed hereinabove and may be stored in a revising configuration file of the PTEF component.

If, at block 1014 the value of $U_r$ is determined to not be greater than a user's touch region, the flow proceeds to block 1010. In this case, a determination is made that the multiple raw touch events that were received do represent separate events. Accordingly, one or more "touch move" events are output after an original "touch press" event is output.

If, at block 1014 the value of $U_r$ is determined to be greater than a user's touch region, the flow proceeds to block 1016. At block 1016 a determination is made that the multiple raw touch events received actually represent only a single touch event. Accordingly, only a single touch event "touch press" is output.

FIG. 11 presents an exemplary third logic flow 1100. At block 1102 raw touch events are received.

At block 1104 a determination is made as to whether a "jitter smoothing" plug-in is active. The "jitter smoothing" plug-in may form part of a set of plug-ins of a revising plug-in group as described hereinabove.

If the "jitter smoothing" plug-in is not active, the flow moves to block 1106. At block 1106, the raw touch events are processed without revision by the "jitter smoothing" plug-in.

If, at block 1104, the "jitter smoothing" plug-in is determined to be active, the flow moves to decision block 1108, where a determination is made as to whether the time interval between two succeeding events is smaller than a threshold. In one example, the threshold may be set to reflect an interval that represents an upper limit that is indicative of a double tap as opposed to a set of separate single taps. If, at block 1108 a determination is made that the time interval is smaller than the threshold, the flow moves to block 1110.

At block 1110 a determination is made that because the interval between the raw touch events is longer than the threshold, the raw touch events are meant to represent separate single taps. Accordingly, the two single tap events are output as originally received.

If, at block 1108 a determination is made that the time interval is not smaller than the threshold, the flow moves to block 1112. At block 1112, the area $U_r$ that represents the area of a single region defined by the sum of the multiple touch events is determined. In addition, the area of intersecting regions between the different touch events $\cap_{r\ is}$ determined.

The flow then moves to decision block 1114, where a determination is made as to whether the ratio $\cap_r/U_r$ is larger than a user rate. If the ratio is larger than a user rate, then the logic flow moves to block 1110 where two single tap events are emitted.

IF the ratio is smaller than a user rate, the logic flow moves to block 1116. At block 1116, a "double tap" event is output with an intersection region.

Figure 12:
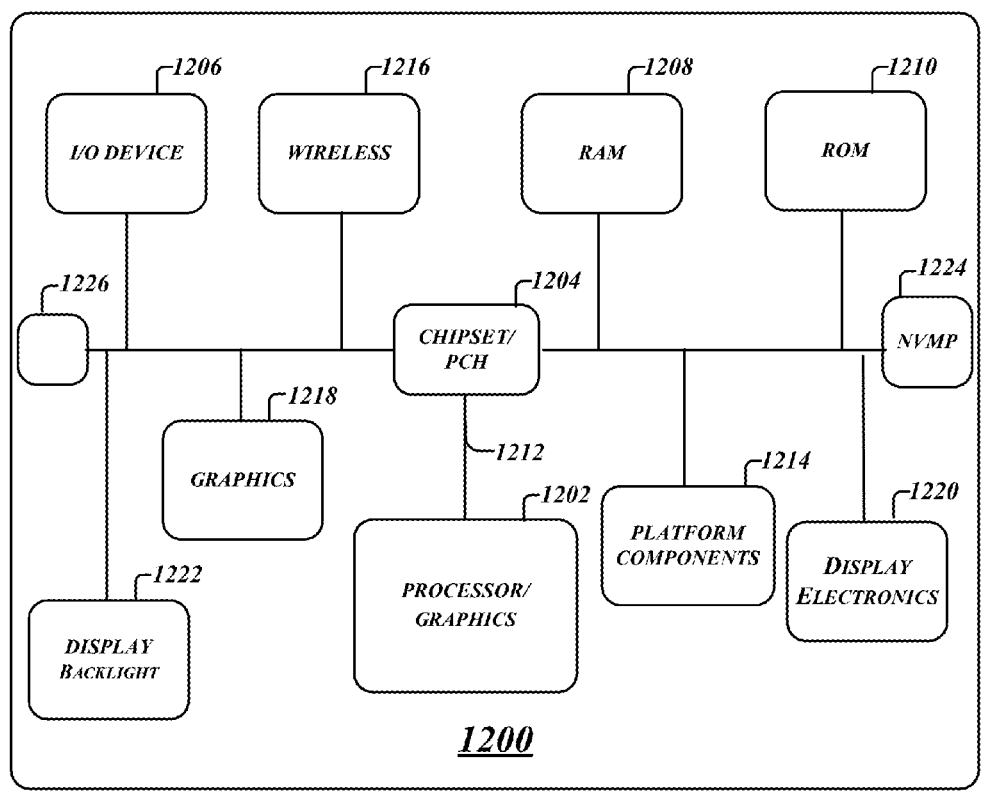
FIG. 12 illustrates one embodiment of a device platform.

FIG. 12 is a diagram of an exemplary system embodiment and in particular, FIG. 12 is a diagram showing a platform 1200, which may include various elements. For instance, FIG. 12 shows that platform (system) 1210 may include a processor/graphics core 1202, a chipset/platform control hub (PCH) 1204, an input/output (I/O) device 1206, a random access memory (RAM) (such as dynamic RAM (DRAM)) 1208, and a read only memory (ROM) 1210, display electronics 1220, display backlight 1222, and various other platform components 1214 (e.g., a fan, a crossflow blower, a heat sink, DTM system, cooling system, housing, vents, and so forth). System 1200 may also include wireless communications chip 1216 and graphics device 1218. The embodiments, however, are not limited to these elements.

As shown in FIG. 12, I/O device 1206, RAM 1208, and ROM 1210 are coupled to processor 1202 by way of chipset 1204. Chipset 1204 may be coupled to processor 1202 by a bus 1212. Accordingly, bus 1212 may include multiple lines.

Processor 1202 may be a central processing unit comprising one or more processor cores and may include any number of processors having any number of processor cores. The processor 1202 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1202 may be multiple separate processors located on separate integrated circuit chips. In some embodiments processor 1202 may be a processor having integrated graphics, while in other embodiments processor 1202 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may comprise a touch-sensitive user interface, a processor circuit, and a personalized touch event filter that includes a touch trainer module for execution on the processor circuit to generate a user touch profile based upon user touch input received at the touch-sensitive user interface, and a revising plug-in component for execution on the processor circuit to generate a revised touch event based upon a raw touch event received at the touch-sensitive user interface and the user touch profile.

In another embodiment, the touch trainer module may be for execution on the processor circuit to receive device information, and to generate the user touch profile based upon the device information and the user touch input.

Alternatively, or in addition, in a further embodiment, the touch trainer module may be for execution on the processor circuit to read a current user touch profile based upon touch input from a first user, to receive additional touch input from the first user, and to generate an updated user touch profile based upon the current user touch profile and the additional touch input.

Alternatively, or in addition, in a further embodiment, the apparatus may include a touch trainer module activation/deactivation component for execution on the processor circuit to place the touch trainer module in an active or an inactive state according to user selection.

Alternatively, or in addition, in a further embodiment the touch trainer module may be for execution on the processor circuit to store a first user specific profile based upon user touch input that is received at the user interface when a first action is performed by a user, and to store a second user touch profile based upon user touch input that is received at the user interface when a second action different from the first action is performed by the user.

store a first user specific profile based upon first user touch input that is received at the user interface, and store a second user touch profile based upon second user touch input that is received at the user interface.

Alternatively, or in addition, in a further embodiment, the revising plug-in group may include a press region identifier plug-in for execution on the processor circuit to determine when a set of multiple touch invents represents one touch event, and a jitter smoothing plug-in for execution on the processor circuit to determine when a set of multiple touch release events represents a double tap event.

Alternatively, or in addition, in a further embodiment the revising plug-in group may be for execution on the processor circuit to analyze a multiplicity of raw touch events, and to generate a respective multiplicity of revised touch events.

Alternatively, or in addition, in a further embodiment the apparatus may include a plug-in activation component for execution on the processor circuit to place one or more plug-ins of the revising plug-in component in an active or inactive state according to user selection.

Alternatively, or in addition, in a further embodiment the press region identifier plug-in may be for execution on the processor circuit to calculate an area of the multiple touch events, to determine if the area of the multiple touch events exceeds a user's touch region, and to output a single "touch press" event if the area of the multiple touch events does not exceed a user's touch region.

Alternatively, or in addition, in a further embodiment the jitter smoothing plug-in may be for execution on the processor circuit to calculate an area $U_R$ of the multiple touch release events, calculate an area of intersection $\cap_R$ of the multiple touch release events, determine if the area of the multiple touch events exceeds a user's touch region, and output a "double tap" event when a ratio $\cap_R/U_R$ single is not greater than a user's rate.

Alternatively, or in addition, in a further embodiment the apparatus may comprise a touchscreen display.

In a further embodiment, a computer implemented method may include receiving one or more touch events, generating a user touch profile based upon user touch input at the user interface, and generating a revised touch event based upon a raw touch event received at the user interface and the user touch profile.

In a further embodiment, a computer implemented method may include receiving user touch input at a touch sensitive user interface, generating a user touch profile based upon the user touch input at the user interface, and generating a revised touch event based upon a raw touch event received at the touch sensitive user interface and the user touch profile.

In a further embodiment the computer implemented method may include receiving device information, and generating the user touch profile based upon the device information and the user touch input.

Alternatively, or in addition, in a further embodiment the computer implemented method may include placing the touch trainer module in an active or an inactive state according to user selection.

Alternatively, or in addition, in a further embodiment the computer implemented method may include storing a first user specific profile based upon user touch input that is received at the user interface when a first action is performed by a user, and storing a second user touch profile based upon user touch input that is received at the user interface when a second action different from the first action is performed by the user.

Alternatively, or in addition, in a further embodiment the computer implemented method may include determining when a set of multiple touch invents represents one touch event, and determining when a set of multiple touch release events represents a double tap event.

Alternatively, or in addition, in a further embodiment the computer implemented method may include analyzing a multiplicity of raw touch events, and generating a respective multiplicity of revised touch events.

Alternatively, or in addition, in a further embodiment the computer implemented method may include placing one or more plug-ins of the revising plug-in component in an active or inactive state according to user selection.

Alternatively, or in addition, in a further embodiment the computer implemented method may include calculating an area of the multiple touch events, determining if the area of the multiple touch events exceeds a user's touch region, and outputting a single "touch press" event if the area of the multiple touch events does not exceed a user's touch region.

Alternatively, or in addition, in a further embodiment the computer implemented method may include calculating an area $U_R$ of the multiple touch release events, calculating an area of intersection $\cap_R$ of the multiple touch release events, determining if the area of the multiple touch events exceeds a user's touch region, and outputting a "double tap" event when a ratio $\cap_R/U_R$ single is not greater than a user's rate.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other.

For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

The invention claimed is:

1. An apparatus, comprising:
a touch-sensitive user interface;
a processor circuit; and
a revising plug-in component for execution on the processor circuit to generate a revised touch event based upon a raw touch event received at the touch-sensitive user interface, the raw touch event comprising a set of multiple touch release events, the revising plug-in component to:
calculate an area of the multiple touch release events and calculate an area of intersection of the multiple touch release events;
determine whether a ratio of the intersection of the multiple touch release events over the area of the multiple touch release events is greater than a user's rate; and
output the revised touch event as a "double tap" event based on a determination that the ratio of the intersection of the multiple touch release events over the area of the multiple touch release events is not greater than the user's rate; or
output the revised touch event as a "single tap" event based on a determination that the ratio of the intersection of the multiple touch release events over the area of the multiple touch release events is greater than the user's rate.

2. The apparatus of claim 1, the revising plug-in component to determine whether an interval between the multiple touch release events exceeds a threshold interval and output the revised touch event as a "single tap" event based on a determination that the interval between the multiple touch release events exceeds the threshold interval.

3. The apparatus of claim 2, the revising plug-in component to:
determine whether the interval between the multiple touch release events exceeds the threshold interval before calculating the area of the multiple touch release events and calculate an area of intersection of the multiple touch release events; and
skip calculating an area of the multiple touch release events and calculate an area of intersection of the multiple touch release events and determining whether a ratio of the intersection of the multiple touch release events over the area of the multiple touch release events is greater than a user's rate based on a determination that the interval between the multiple touch release events exceeds the threshold interval.

4. The apparatus of claim 1, comprising a touch trainer module for execution on the processor circuit to generate a user touch profile based upon user touch input received at the touch-sensitive user interface, the user touch profile to include an indication of the user's rate.

5. The apparatus of claim 4, the touch trainer module to:
receive device information; and
generate the user touch profile based upon the device information and the user touch input.

6. The apparatus of claim 4, the touch trainer to:
determine whether a self-training mode is active; and
determine whether the raw touch event corresponds to an unexpected operation and update the user touch profile to include an indication of the unexpected operation based on a determination that the self-training mode is active.

7. The apparatus of claim 4, comprising a touch trainer module activation/deactivation component for execution on the processor circuit to place the touch trainer module in an active or an inactive state according to user selection.

8. The apparatus of claim 4, the touch trainer module to:
store a first user specific profile based upon first user touch input that is received at the user interface; and
store a second user touch profile based upon second user touch input that is received at the user interface.

9. The apparatus of claim 1, the revising plug-in component to:
analyze a multiplicity of raw touch events in chronological order; and
generate a respective multiplicity of revised touch events.

10. The apparatus of claim 1, comprising a touchscreen display.

11. At least one non-transitory computer-readable storage medium comprising a plurality of instructions that, when executed, cause a system to:
calculate an area of multiple touch release events and calculate an area of intersection of the multiple touch release events;
determine whether a ratio of the intersection of the multiple touch release events over the area of the multiple touch release events is greater than a user's rate; and
output revised touch event as a "double tap" event based on a determination that the ratio of the intersection of the multiple touch release events over the area of the multiple touch release events is not greater than the user's rate; or
output the revised touch event as a "single tap" event based on a determination that the ratio of the intersection of the multiple touch release events over the area of the multiple touch release events is greater than the user's rate.

12. The at least one non-transitory computer-readable storage medium of claim 11, comprising instructions that, when executed, cause the system to determine whether an interval between the multiple touch release events exceeds a threshold interval and output the revised touch event as a "single tap" event based on a determination that the interval between the multiple touch release events exceeds the threshold interval.

13. The at least one non-transitory computer-readable storage medium of claim 12, comprising instructions that, when executed, cause the system to:
determine whether the interval between the multiple touch release events exceeds the threshold interval before calculating the area of the multiple touch release events and calculate an area of intersection of the multiple touch release events; and
skip calculating an area of the multiple touch release events and calculate an area of intersection of the multiple touch release events and determining whether a ratio of the intersection of the multiple touch release events over the area of the multiple touch release events is greater than a user's rate based on a determination that the interval between the multiple touch release events exceeds the threshold interval.

14. The at least one non-transitory computer-readable storage medium of claim 11, comprising instructions that, when executed, cause the system to generate a user touch profile based upon user touch input received at a touch-sensitive user interface, the user touch profile to include an indication of the user's rate.

15. The at least one non-transitory computer-readable storage medium of claim 14, comprising instructions that, when executed, cause the system to:
receive device information; and
generate the user touch profile based upon the device information and the user touch input.

16. The at least one non-transitory computer-readable storage medium of claim 14, comprising instructions that, when executed, cause the system to:
determine whether a self-training mode is active; and
determine whether a raw touch event corresponds to an unexpected operation and update the user touch profile to include an indication of the unexpected operation based on a determination that the self-training mode is active.

17. The at least one non-transitory computer-readable storage medium of claim 16, comprising instructions that, when executed, cause the system to activate or deactivate the self-training mode according to user selection.

18. The at least one non-transitory computer-readable storage medium of claim 14, comprising instructions that, when executed, cause the system to:
store a first user specific profile based upon first user touch input that is received at the touch-sensitive user interface; and
store a second user touch profile based upon second user touch input that is received at the touch-sensitive user interface.

19. The at least one non-transitory computer-readable storage medium of claim 11, comprising instructions that, when executed, cause the system to:
analyze a multiplicity of raw touch events in chronological order; and
generate a respective multiplicity of revised touch events.

20. A system comprising:
a touch screen;
logic, at least a portion of which is in hardware;
a touch screen user interface for execution by the logic; and
a revising plug-in for execution by the logic to generate a revised touch event based upon a raw touch event received at a touch-sensitive user interface, the raw touch event comprising a set of multiple touch release events, the revising plug-in to:
calculate an area of the multiple touch release events and calculate an area of intersection of the multiple touch release events;
determine whether a ratio of the intersection of the multiple touch release events over the area of the multiple touch release events is greater than a user's rate; and
output the revised touch event as a "double tap" event based on a determination that the ratio of the intersection of the multiple touch release events over the area of the multiple touch release events is not greater than the user's rate; or
output the revised touch event as a "single tap" event based on a determination that the ratio of the intersection of the multiple touch release events over the area of the multiple touch release events is greater than the user's rate.

21. The system of claim 20, the revising plug-in to determine whether an interval between the multiple touch release events exceeds a threshold interval and output the revised touch event as a "single tap" event based on a determination that the interval between the multiple touch release events exceeds the threshold interval.

22. The system of claim 21, the revising plug-in to:
determine whether the interval between the multiple touch release events exceeds the threshold interval before calculating the area of the multiple touch release events and calculate an area of intersection of the multiple touch release events; and skip calculating an area of the multiple touch release events and calculate an area of intersection of the multiple touch release events and determining whether a ratio of the intersection of the multiple touch release events over the area of the multiple touch release events is greater than a user's rate based on a determination that the interval between the multiple touch release events exceeds the threshold interval.

\* \* \* \* \*